Aug. 1, 1939.   W. C. BUTTNER   2,168,059
BEVERAGE DISPENSING SYSTEM AND APPARATUS
Filed March 31, 1936   2 Sheets-Sheet 2

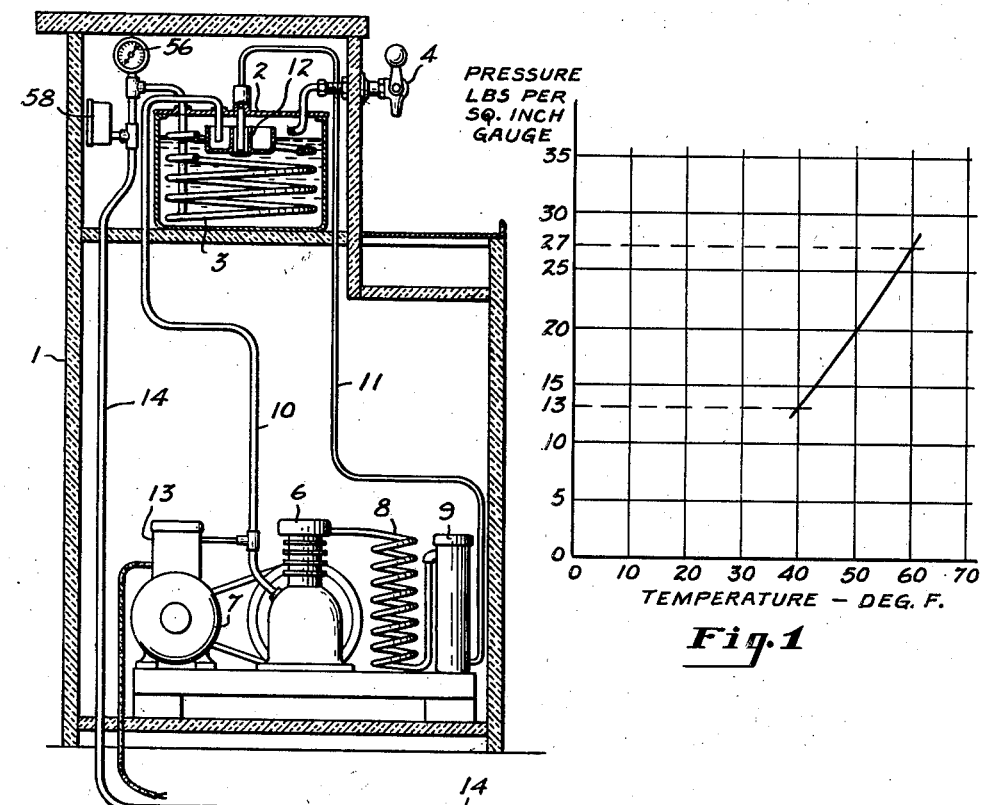
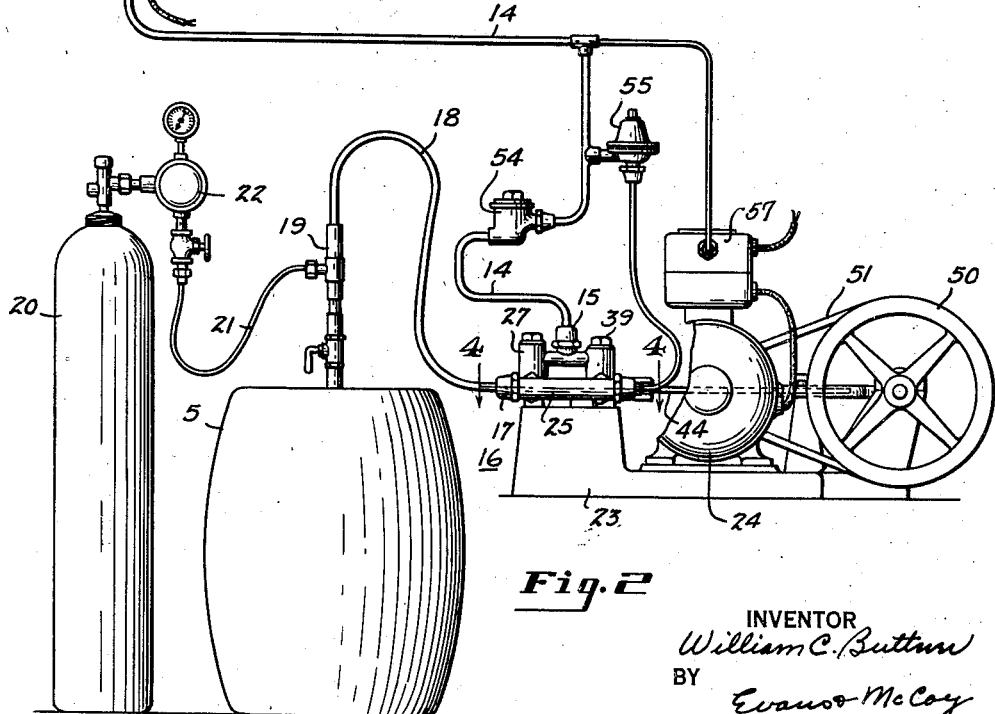

INVENTOR
William C. Buttner
BY
Evans & McCoy
ATTORNEYS

Patented Aug. 1, 1939

2,168,059

UNITED STATES PATENT OFFICE 2,168,059

BEVERAGE DISPENSING SYSTEM AND APPARATUS

William C. Buttner, Winnetka, Ill., assignor to The Bastian Blessing Company, Chicago, Ill., a corporation of Illinois Application March 31, 1936, Serial No. 71,916

10 Claims. (Cl. 225—1)

This invention relates to a method of and apparatus for dispensing carbonated beverages, such as, for example, beer.

One of the objects of the present invention is to provide beer dispensing apparatus of new and improved construction, by means of which beer can be dispensed without undue release of the absorbed or natural $CO_2$ gas, and when dispensed will be fresh and palatable, and at the desired temperature.

Another object is to provide an improved method and apparatus by means of which beer may be dispensed at the desired temperature and with a quantity of $CO_2$ gas, sufficient to give the sharpness and palatability intended by the brewer, maintained in the absorbed state and in close bonded relation in the beer, but without materially increasing the pressure on the beer within the keg or source of supply beyond the natural pressure thereof.

Another object is to provide an improved method and apparatus for dispensing beer by means of which the keg or source of supply may be located a considerable distance from the cooling and dispensing unit, and yet by means of which the beer may be dispensed at the desired rate of flow without undue release of the absorbed or natural $CO_2$ gas.

A further object is to provide beer dispensing apparatus with means for supplying the keg or source of supply with $CO_2$ gas and regulating the pressure on the beer in accordance with the temperature of the beer.

A further object is to provide a method of and apparatus for dispensing beer whereby the beer may be withdrawn from a keg under a low pressure and delivered to a dispensing and cooling unit in a manner such that under static conditions the beer in the unit will be under a pressure greater than that on the beer in the keg.

With the above and other objects in view, the present invention consists in certain features of construction, combination of parts and procedure to be hereinafter described with reference to the accompanying drawings, and then claimed.

In the drawings, which illustrate an embodiment of the invention,

Figure 1 is a chart showing the approximate pressure temperature relation of a beer containing, for example, 2½ volumes of $CO_2$ gas;

Figure 2 is a schematic view of the beer dispensing system;

Figure 3:
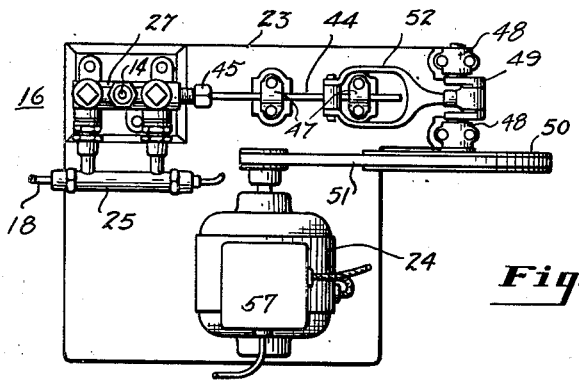
Figure 3 is a plan view of the pumping mechanism shown in Figure 2.
Figure 4:
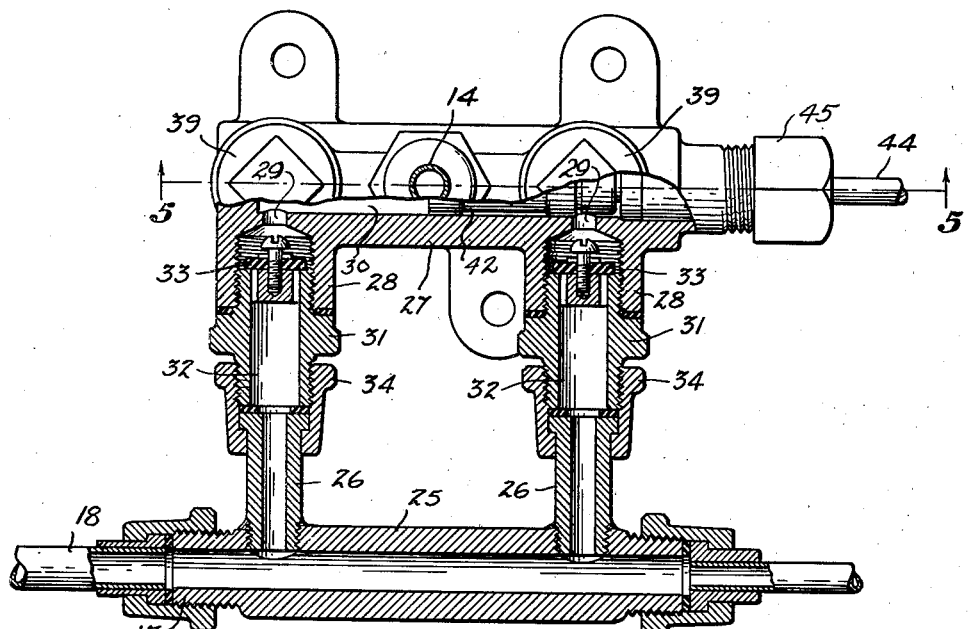
Figure 4 is a transverse section taken on line 4—4 of Figure 2.
Figure 5:
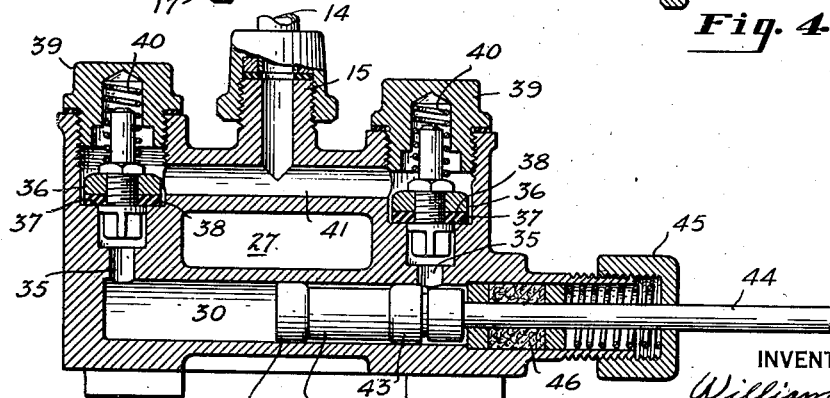
Figure 5 is a section taken on line 5—5 of Figure 4.

It is well known that beer derives a considerable portion of its palatability and sharpness from the $CO_2$ gas contained therein in the absorbed state, and that it is desired to preferably dispense the same with the amount of $CO_2$ gas with which it is initially charged, maintained in the absorbed state, this being the amount that the brewer intended it to have.

There is a definite relation between the pressure of the $CO_2$ gas in the beer and the temperature. This relation for a beer containing, for example, 2½ volumes of $CO_2$ gas, is shown in the graph of Figure 1. It will be noted from the graph that at 40° F. the pressure is 13 pounds per square inch, and at 60° F., for example, the pressure is twenty-seven pounds per square inch.

The graph represents the balanced condition, that is, the pressure essential at any specified temperature to maintain the $CO_2$ gas in the absorbed state. Therefore, at temperatures of 40° F. and 60° F. thirteen and twenty-seven pounds per square inch, respectively, are required to maintain the gas in the absorbed state. The pressures here given and indicated in the graph are approximate, however, and may vary slightly.

The ideal beer dispensing and cooling system, of course, is one in which the beer can be drawn at the proper or desired temperature and rate of flow and have maintained therein the absorbed state substantially all of the $CO_2$ gas which the brewer intended it to have, or in other words, the gas with which it was initially charged. Such a system would be so designed that under static conditions, the pressure on the beer at all points in the system would be not lower than that shown in the graph for any specified temperature.

Beer cooling and dispensing systems have been devised heretofore in which the above desired dispensing conditions can be obtained. Among these systems are coil and tank systems, some of which employ restrictions, or throttles, and others of which employ special coils or conduits.

Two of such systems are disclosed in Beggs Patent No. 1,289,364 and Seitz Patent No. 2,013,425, dated December 31, 1918, and September 3, 1935, respectively, but in these systems and all other systems which are capable of producing the desired cooling and dispensing conditions, it is necessary to create high pressures within the keg, such pressures being partly dependent upon the elevation of the dispensing unit relative to the keg or source of supply and upon the temperature of the beer in the keg, and ranging from thirty to forty or forty-five pounds per square inch.

Considerable objection to the use of such high pressures has been entered on the part of the brewers because of the fact that the conventional wooden kegs will not withstand the higher pressures and will develop leaks.

Another disadvantage of these previously known systems is, that in instances where the dispensing unit is located a considerable distance from the keg or source of supply, the pressure drop in the line from the keg to the dispensing unit is so great that the keg could not withstand the pressures that would have to be used.

Referring to the accompanying drawings in which like numerals refer to like parts throughout the several views, I have schematically shown in Figure 2, a beer dispensing system of the present invention and have included, for the purpose of illustration a beer dispensing unit of the general type disclosed in the aforementioned Seitz Patent No. 2,013,425.

The unit shown is of the mechanically refrigerated type and includes a cabinet 1 within which the cooling unit is disposed. The cooling unit comprises a casing 2, containing the coiled beer conduit 3 which communicates externally of the casing with a dispensing faucet 4, and, in a manner about to be described, with the keg or source of supply 5.

The cooling unit is of the flooded type and comprises a compressor 6 driven by a motor 7, a condenser 8 and a receiver 9. Refrigerant is drawn from the casing 2 through suction conduit 10, compressed and discharged through the condenser 8 to the receiver 9, from whence it passes through the high side conduit 11 to a valve (not shown) controlled by a float 12 located within the casing 2, the valve controlling the admission of the refrigerant into the casing 2. A pressure controlled switch 13 controls the operation of the motor and compressor.

The inlet of the coiled beer conduit 3 is connected by means of a conduit 14 to the outlet 15 of a pump mechanism 16 located near the keg 5 or source of supply. The inlet 17 of the pump mechanism is connected by means of a conduit 18 to the tap rod 19 of the keg 5. A tank 20 or other source of supply of $CO_2$ gas is connected by means of conduit 21 with the keg 5.

It is one of the objects of my invention, as previously set forth, to obviate the use of high pressures in the keg, and employ a keg pressure which does not materially exceed the natural pressure, or, in other words, I supply the keg with $CO_2$ gas at a pressure which is sufficient, regardless of the amount of liquid beer in the keg, to keep the $CO_2$ gas in solution at any given temperature.

It is known, of course, that after the keg is tapped and beer drawn therefrom, the pressure will drop, due to the removal of the beer, which pressure drop will permit some of the $CO_2$ gas to come out of solution, unless some means is provided for increasing the pressure simultaneously with the withdrawal from the keg.

It is also known that if the temperature of the beer should increase, a greater pressure will be required to keep the gas in solution than would be necessary at the lower temperature.

I provide, in accordance with my invention, a pressure-temperature compensator 22 in association with the gas tank 20 or conduit 21 which will function at all times to automatically provide a $CO_2$ gas pressure in the keg which is at least sufficient to maintain the $CO_2$ gas in the absorbed state.

Assuming that a beer containing 2½ volumes of $CO_2$ gas, for example, is to be dispensed and that the beer is at a temperature of 50° F., the pressure in the untapped keg will be approximately 19.5 pounds per square inch, this being the natural pressure as will be seen from the graph. The keg, of course, is tapped with as little loss of $CO_2$ gas as possible, and the tank 20 is placed in communication with the keg. The pressure-temperature compensator 22 is so adjusted that it will not only immediately respond to any decrease in pressure in the keg, due to withdrawal of beer from the keg, and admit a sufficient amount of $CO_2$ gas into the keg to keep the keg pressure at 19.5 pounds per square inch or slightly above this pressure, but also to any increase in temperature to admit sufficient $CO_2$ gas into the keg to raise the keg pressure to that pressure necessary to keep the gas in solution at the particular increased temperature. For example, should the temperature increase to 60° F., the compensator 22 will immediately, at the beginning of the temperature rise, admit additional $CO_2$ gas into the keg, so that when the temperature is at 60° F. the pressure created by the gas in the keg will be at least 27 pounds per square inch, or slightly thereover, this being the pressure, as will be seen from the graph, necessary to keep the $CO_2$ gas in solution at a temperature of 60° F.

The compensator 22, therefore, is so adjusted that it, regardless of temperature and/or beer volume changes, will automatically insure a pressure in the keg such that the beer will retain its initial charge of $CO_2$ gas.

If desired the pressure-temperature compensator may be replaced by a conventional pressure regulator which will insure a predetermined gas pressure in the keg sufficient to keep the initial charge of $CO_2$ gas in solution.

Also, by admitting $CO_2$ gas, instead of air, into the keg to compensate for the lowering of pressure, due to the decrease in volume of beer, all effect of partial pressures on the ability of the beer to retain its initial charge of $CO_2$ is avoided.

The pumping mechanism 16 previously referred to includes, in the embodiment shown for the purpose of illustration, a base 23 which supports a driving motor 24 and pump proper. The pump proper in this embodiment comprises a tubular inlet portion 25 having the inlet 17 to which the conduit 18 is connected, a pair of spaced horizontally disposed tubular portions 26, and a combined cylinder and outlet portion 27, the latter being formed with spaced internally threaded extensions 28 having passageways 29 that open into a longitudinally extending piston bore 30. Threaded into the extensions 28 are tubular nipples 31 which carry check valves 33. The nipples 31 are connected by means of suitable connectors 34 with the tubular portions 26.

The cylinder and outlet portion 27 is formed with spaced vertical outlet passages 35 which are counterbored at 36 to provide valve seats 37 upon which suitable discharge valves 38 are normally seated. The counterbores 36 are closed by caps 39 which house compression springs 40 that resiliently hold the valves against their seats 37.

The counterbores 36 above the valve seats 37 open into a common passageway 41 which communicates with the outlet 15, the outlet 15 being connected with the beer conduit 14 which communicates with the cooling unit.

Mounted within the cylinder bore 30 is a double acting plunger 42 having suitable, spaced bore-engaging members 43 disposed between the outlet ports 35.

The plunger rod 44 for actuating the plunger 42 extends through a bore-closing cap 45 and a suitable seal 46, closely surrounding the rod 44, is disposed within an enlargement of the bore 30. The rod 44, externally of the bore 30, has slidable bearing engagement with spaced supports 47.

A crankshaft 49 having a flywheel 50 thereon is mounted in suitable journals 48 and is connected with the rod 44 by means of a connecting rod 52. The crankshaft is driven from the motor 24 by a belt 51 which operates on the flywheel 50.

Preferably connected with the beer conduit 14 is a back-pressure check valve 54 and a safety valve 55. The safety valve 55 is so connected with the pump inlet portion 25 that should it operate to relieve the pressure in the line 14, the beer will by-pass into the inlet portion 25.

If desired a pressure gauge 56 may be connected into the beer conduit 14 at any convenient location, such as in the cabinet 1 and adjacent the cooling unit as shown in Fig. 2.

The motor 24 which drives the pump is controlled by means of a pressure operated switch 57 which is subjected to the pressure in the beer conduit 14.

The inlet valves 33, discharge valves 38 and plunger of the pump are so arranged that upon each stroke of the plunger, beer is drawn into one end of the cylinder bore 30 while simultaneously therewith beer is forced out of the opposite end of the bore 30 and through the conduit 14 to the cooling conduit 3.

Beer, of course, is drawn into the pump at its natural pressure or slightly thereunder and the pressure is automatically stepped up until a predetermined pressure is attained and the pump ceases operation through the opening of the pressure-controlled switch 57. This establishes a static pressure which is above the balanced pressure, or, in other words, above the pressure which is required to maintain the $CO_2$ gas in the absorbed state.

The control 57 is so adjusted that it will stop the motor and pump when this last named predetermined pressure is reached and that upon the opening of the faucet 4 for drawing beer, it will immediately start the pump into operation, so as to supply beer to the cooling unit simultaneously with the withdrawal.

While the faucet is open for the withdrawal of beer from the system the beer is advanced through the conduits 14 and 3 by the pump 16 which is set in operation by the control switch 57 in response to the fall in pressure in these conduits. The flow of the beer through the conduits is uniform and even, and at a rate dependent upon the capacity and speed of operation of the pump. This method of dispensing is distinct from previous types in which the beer flow through the faucet is entirely dependent upon the pressure of a gas cushion which often causes the beer to flow too rapidly at the beginning of each withdrawal, causing foaming and which is apt to diminish in effectiveness as the withdrawal of beer is continued. As soon as the faucet of this improved dispenser is opened, the pressure in the line back to the pump drops and starts the pump, the effect being somewhat similar to the opening or decapping of a bottle of beer. The uniform and even flow of the beer out of the faucet is something like a careful pouring of quiet beer from the opened bottle.

Momentarily during the flowing condition, the pressure may drop below the balanced pressure for that particular beer, as represented in the graph, but immediately upon closing of the faucet, the predetermined pressure, which is well above the natural pressure, is reestablished.

The back pressure check valve 54 functions to safeguard the pump from the backing up of the beer under pressure, and the safety valve 55 functions to safeguard the cooling and dispensing unit in the event the pump, for some inadvertent reason, should fail to stop when the pressure at the control 57 reaches the pressure at which it is adjusted to stop the pump.

The present invention provides a means whereby a pressure of a value corresponding to the natural pressure may be employed on the beer in the keg, and whereby the dispensing unit may be located a considerable distance away from the keg or source of supply, and, yet, allow for the dispensing of beer at the desired rate of flow without undue release of the absorbed $CO_2$ gas.

There is a decided difference in the physical behavior of beer in which the carbonic acid gas is loosely bound, as in agitated beer, and where the carbonic acid gas is closely bound, as in beer that has remained quiet for several hours, although the gas content of the beer is exactly the same. The close bonding of carbonic acid gas in beer may result from a few hours of quiet that binds in the gas content of the beer so that when the pressure on the beer is reduced there is no violent effervescence and loss of gas in the beer. It has been found that when pressures of as low as six or seven pounds more than the natural or balanced pressure is applied to the beer, such pressure closely binds the gas content of the beer within a very few minutes. This produces quiet beer, as distinguished from what is known in the trade as wild beer, and greatly facilitates the handling of the beer and the quality of beer delivered to the customer. One of the functions of the above described system of control is to impose pressures on the beer that are somewhat in excess of the natural or balanced pressures, so that the beer within the system between the pump and the dispensing faucet is subjected to pressures greater than the saturation pressure for the particular temperature of the beer in the various parts of the system to thereby bind in the carbonic acid gas and effectively quiet beer, even though it is tapped immediately after delivery and while the beer in the keg is in agitated condition. This quieting influence of the pressure on the beer permits the delivery of the beer to the customer's glass in the same quiet condition that would result if the beer had stood for several hours in an undisturbed state.

Obviously any kind of cooling and dispensing mechanism, either coil or tank system, may be substituted for the cabinet 1. It is desirable, however, to embody a sufficient length of small tubing to permit the application to the beer between the pumps and the faucet of pressures above the natural or balanced pressures, although the inventive concept may also be applied to systems in which such pressures are not employed, but with less beneficial results. Such a system might be used where the difference in elevation of the pump and the dispenser permitted some portions of the system to drop below the balanced pressure of the beer. The essential element of the system resides in the application of a booster pressure to the beer after it leaves the keg in the combinations set forth in the appended claims.

While the cooling and dispensing unit shown and described is of a mechanically refrigerated type, it is to be understood that the invention is also applicable to other types, and to ice cooled units as well. Also, the pump may be of any suitable construction.

The pressure controlled switches 13 and 57 and the pressure-temperature compensator 22 are schematically shown, and in view of the fact that these elements may be of any suitable conventional type, they are not shown in detail.

It is to be understood that the particular form of apparatus shown and described, and the particular procedure set forth, are presented for purposes of explanation and illustration and that various modifications of the apparatus and procedure may be made without departing from my invention as defined in the appended claims.

What I claim is:

1. The method of dispensing beverage from a container which comprises maintaining a pressure in the container sufficient to substantially maintain the original charge of $CO_2$ in the beverage in the absorbed state, withdrawing beverage from the container, increasing the pressure on the withdrawn beverage, maintaining the increased pressure on the withdrawn beverage during static conditions well above the pressure maintained on the beverage in the container and independent thereof, intermittently withdrawing beverage from the system for consumption, and reducing the said increased pressure during each of said last named withdrawals.

2. The method of dispensing beverage from a container which comprises maintaining a pressure in the container sufficient to substantially maintain the original charge of $CO_2$ in the beverage in the absorbed state, conducting beverage from the container over a course including a pressure increasing stage and a cooling stage, intermittently withdrawing cooled beverage from the course as desired, increasing the pressure on the beverage in the course well above the pressure maintained on the beverage in the container between successive withdrawals of cooled beverage to effect a reabsorption of gas released by beverage in the course during a previous period of withdrawal, and maintaining said increased pressure on the beverage in the course independently of the pressure in the container.

3. Apparatus for dispensing beverage comprising a container, a cooling unit, means for maintaining a pressure within the container slightly in excess of the balance pressure required to maintain in solution in the beverage in the container substantially all of the original $CO_2$ content, means independent of said pressure maintaining means for withdrawing beverage from the container and delivering said withdrawn beverage to the cooling unit at an increased pressure well above the balance pressure, said increased pressure being sufficient, under static conditions, to effect reabsorption of $CO_2$ released from the beverage.

4. Apparatus for dispensing beverage from a container, comprising means for maintaining a pressure in the container slightly in excess of the balance pressure sufficient to substantially maintain the initial charge of $CO_2$ gas in solution in the beverage in the container, a conduit connected to the container and through which beverage can be withdrawn, and means independent of said first mentioned pressure maintaining means for increasing the pressure on beverage in the conduit to a static pressure well above the pressure maintained in the container, said pressure increasing means arranged to maintain pressures on beverage withdrawn from the container during static conditions well above the balance pressure and container pressure, and sufficient to effect a reabsorption of gas released from the beverage in the conduit.

5. Apparatus for dispensing beverage, comprising a container, means for maintaining a pressure within the container slightly in excess of the balance pressure required to maintain in solution in the beverage in the container substantially all of the original $CO_2$ content, a conduit connected to the container and through which beverage can be withdrawn, and means interposed in said conduit adjacent the container end thereof and independent of said pressure maintaining means, to increase the pressure on withdrawn beverage well above the balance pressure and the pressure maintained in the container, said increased pressure being sufficient under static conditions to effect reabsorption of $CO_2$ gas released from the beverage.

6. Apparatus for dispensing beverage, comprising a container, means for maintaining a pressure within the container slightly in excess of the balance pressure required to maintain in solution in the beverage in the container substantially all of the original $CO_2$ content, a conduit connected to the container and through which beverage can be withdrawn, a pump interposed in the conduit adjacent the contained end thereof and arranged to increase the pressure on beverage withdrawn from the container through the conduit well above the balance pressure and the pressure in the container, said pump being independent of the pressure maintaining means for the container and the increased pressure being sufficient, under static conditions, to effect reabsorption of $CO_2$ released from the beverage, drive means for the pump, and control means responsive to the pressure in the pump discharge for starting and stopping the pump drive.

7. The method of delivering beverage from a container to a cooling and dispensing unit which comprises continuously maintaining a pressure of $CO_2$ gas in the container that is at least sufficient to maintain in the absorbed state the $CO_2$ gas with which the beverage is initially charged, withdrawing beverage from the container, increasing the pressure on the beverage so withdrawn and delivering the withdrawn beverage to a cooling and dispensing unit at a static pressure at least sufficient to maintain the initial charge of gas in the beverage in the absorbed state in the cooling and dispensing unit.

8. The method of delivering beverage from a container to a cooling and dispensing unit which consists in maintaining a pressure in the container at a value substantially corresponding to but not less than that required to maintain the initial charge of $CO_2$ gas in the absorbed state, withdrawing beverage from the container under such pressure, delivering it to the cooling and dispensing unit, and establishing a predetermined static pressure on the beverage so delivered independently of and greater than the pressure in the container.

9. The method of delivering beverage from a container to a cooling and dispensing unit, which consists in maintaining in accordance with the temperature of the beverage in the container a pressure not materially in excess of that which will prevent the release of any of the initial charge of $CO_2$ gas from the absorbed state, withdrawing beverage from the container, delivering it to the cooling and dispensing unit, and establishing a predetermined pressure on the beverage so withdrawn and delivered which is greater than said first mentioned pressure.

10. The method of dispensing a carbonated beverage from a keg or the like which consists in materially increasing the pressure on the beverage as withdrawn from the keg and absorbing a substantial amount of the increased pressure on the beverage by elevation of the dispensing element and resistance to flow through the system, whereby the beverage is dispensed at normal rates.

WILLIAM C. BUTTNER.